United States Patent
Smith

(10) Patent No.: US 7,237,169 B2
(45) Date of Patent: Jun. 26, 2007

(54) CROSS-MONITORING SENSOR SYSTEM AND METHOD

(75) Inventor: Thad W. (Marc) Smith, Antioch, CA (US)

(73) Assignee: BEI Technologies, Inc., San Francisco, CA (US)

(*) Notice: Subject to any disclaimer, the term of this patent is extended or adjusted under 35 U.S.C. 154(b) by 368 days.

(21) Appl. No.: 10/900,028

(22) Filed: Jul. 26, 2004

(65) Prior Publication Data

US 2006/0016260 A1 Jan. 26, 2006

(51) Int. Cl.
G01R 31/3167 (2006.01)
G01R 31/30 (2006.01)

(52) U.S. Cl. .......... 714/742; 714/717; 73/504.03; 73/504.04; 73/1.37; 73/1.38; 73/510

(58) Field of Classification Search .......... 714/742, 714/25, 48, 724, 732, 717, 47, 43, 2, 1; 73/504.03, 73/504.04, 511, 1.37, 1.38, 510; 702/116; 340/518, 519

See application file for complete search history.

(56) References Cited

U.S. PATENT DOCUMENTS

| | | | |
|---|---|---|---|
| 4,105,900 A * | 8/1978 | Martin et al. ............... 327/526 |
| 4,622,541 A | 11/1986 | Stockdale | |
| 4,654,663 A | 3/1987 | Alsenz et al. | |
| 4,899,587 A | 2/1990 | Staudte | |
| 5,396,144 A | 3/1995 | Gupta et al. | |
| 5,408,876 A | 4/1995 | Macy | |
| 5,426,970 A | 6/1995 | Florida et al. | |
| 5,585,561 A | 12/1996 | Bahl et al. | |
| 6,262,520 B1 | 7/2001 | Knowles | |
| 6,282,496 B1 * | 8/2001 | Chowdhary ............... 701/220 |
| 6,462,530 B1 | 10/2002 | Layton | |
| 6,497,146 B1 | 12/2002 | Hobbs et al. | |
| 6,927,695 B2 * | 8/2005 | Hayden .................. 340/657 |

* cited by examiner

Primary Examiner—Guy Lamarre
Assistant Examiner—Dipakkumar Gandhi
(74) Attorney, Agent, or Firm—Edward S. Wright

(57) ABSTRACT

Cross-monitoring sensor system and method in which a plurality of sensors each having a sensing element, circuitry for processing signals from the sensing element, an output interface for delivering processed signals, and an auxiliary input to which signals from another device can be input for processing and delivery by the output interface. Signals from each of the sensors are applied to the auxiliary input of another one of the sensors, and signals from the output interfaces of the sensors are compared to verify integrity of the system.

19 Claims, 8 Drawing Sheets

CROSS-MONITORING SENSOR SYSTEM AND METHOD

BACKGROUND OF THE INVENTION

1. Field of Invention

This invention pertains generally to angular rate sensors and the like and, more particularly, to a highly reliable sensor system and method for use in applications such as ones where safety is critical.

2. Related Art

In a vibratory rate sensor or gyroscope, a mass is driven to vibrate or oscillate along a drive axis. Rotation of the sensor about an axis perpendicular to the drive axis causes a Coriolis force to be applied to the mass along a response axis which is perpendicular to the drive and sensing axes. The force is proportional to the product of the rate of rotation and the velocity of vibration, and the rate of rotation is determined by monitoring the force or the movement of the mass along the response axis.

Different types of sensing elements are used in such devices. Some are fabricated from silicon wafers, and others are fabricated of crystalline quartz and other piezoelectric materials.

With silicon sensing elements, the masses are commonly driven electrostatically, and the Coriolis induced forces are monitored capacitively. Such structures are generally planar, which tends to maximize the capacitance of the sensing elements.

Piezoelectric rate sensors are commonly in the form of tuning forks having at least one pair of tines which are positioned side-by-side and driven out of phase with each other in the plane of the tines. When the tuning fork is rotated about an axis parallel to the tines, the Coriolis force produces a second (pickup) mode of oscillation in which the tines vibrate in an antiphase manner perpendicular to the plane of the tines. Examples of such rate sensors are found in U.S. Pat. Nos. 4,654,663, 4,899,587, 5,396,144, 5,408,876, 5,585,561 and 6,262,520.

The tuning forks in such rate sensors often have more than one pair of tines, e.g. two pairs of tines arranged in an H-shaped configuration, with one pair being driven in the plane of the fork. The out-of-plane vibration produced by the Coriolis force is torsionally coupled to the other pair of tines, and the two pairs vibrate out-of-plane in opposite directions in the pickup mode. With a central mounting point, the out-of-phase motion of the two sets of tines cancels pickup mode forces at the mounting point, minimizing the effect of boundary conditions at the mount on the pickup mode oscillation.

In safety-critical applications such as automobile stability controls, built-in fault detection is also highly desirable. This typically involves a series of internal monitors to verify proper functioning of individual circuits within the sensor electronics and may include the application of a test signal to the sensing element to validate the integrity of the element and the path of its output signal. Examples of such sensors are found in U.S. Pat. Nos. 5,426,970 and 6,497,146.

Redundancy of sensors has also been utilized to increase reliability in critical applications, and an example of such as system is found in U.S. Pat. No. 6,462,530.

In some prior art sensors with analog outputs, a failure in the sensor is indicated by switching the output voltage to a predetermined level such as the positive rail. In sensors with digital outputs, a microprocessor or micro-controller monitors critical signal levels and indicates the detection of a failure by delivering an error code to the digital output. The digital approach has the advantage that the nature of the failure can be indicated by the error code. The error code can be output in parallel with the sensor data, giving the end user the option of how and/or whether to use the data.

If a digital sensor interface is bidirectional, it may be possible to apply commands to the sensor logic or micro-controller to reset any error flags which have been set.

Communication of the built-in test information depends upon the integrity of the digital interface. If the interface itself were to suffer a fault, the internal logic and/or micro-controller would be unable to transmit either the sensor data or fault diagnostic information. That is an unacceptable risk in applications where safety is critical.

OBJECTS AND SUMMARY OF THE INVENTION

It is, in general, an object of the invention to provide a new and improved sensor system and method.

Another object of the invention is to provide a sensor system and method of the above character which overcomes the limitations and disadvantages of sensors heretofore provided.

Another object of the invention is to provide a sensor system and method of the above character which are highly reliable and suitable for use in applications where safety is critical.

Another object of the invention is to provide a sensor system and method of the above character in which one sensor monitors output signals from another.

These and other objects are achieved in accordance with the invention by providing a cross-monitoring sensor system and method in which a plurality of sensors each having a sensing element, circuitry for processing signals from the sensing element, an output interface for delivering processed signals, and an auxiliary input to which signals from another device can be input for processing and delivery by the output interface. Signals from each of the sensors are applied to the auxiliary input of another one of the sensors, and signals from the output interfaces of the sensors are compared to verify integrity of the system.

DETAILED DESCRIPTION

The invention is disclosed in connection with a vibratory angular rate sensor which has a quartz tuning fork 10 and an electronically configurable or programmable circuit 11, with internal circuit parameters being adjusted or controlled externally. However, it will be understood that the invention is not limited to that particular type of sensing element and sensor and that it can be employed equally well with other types of sensing elements and in other types of sensors.

Figure 1A:
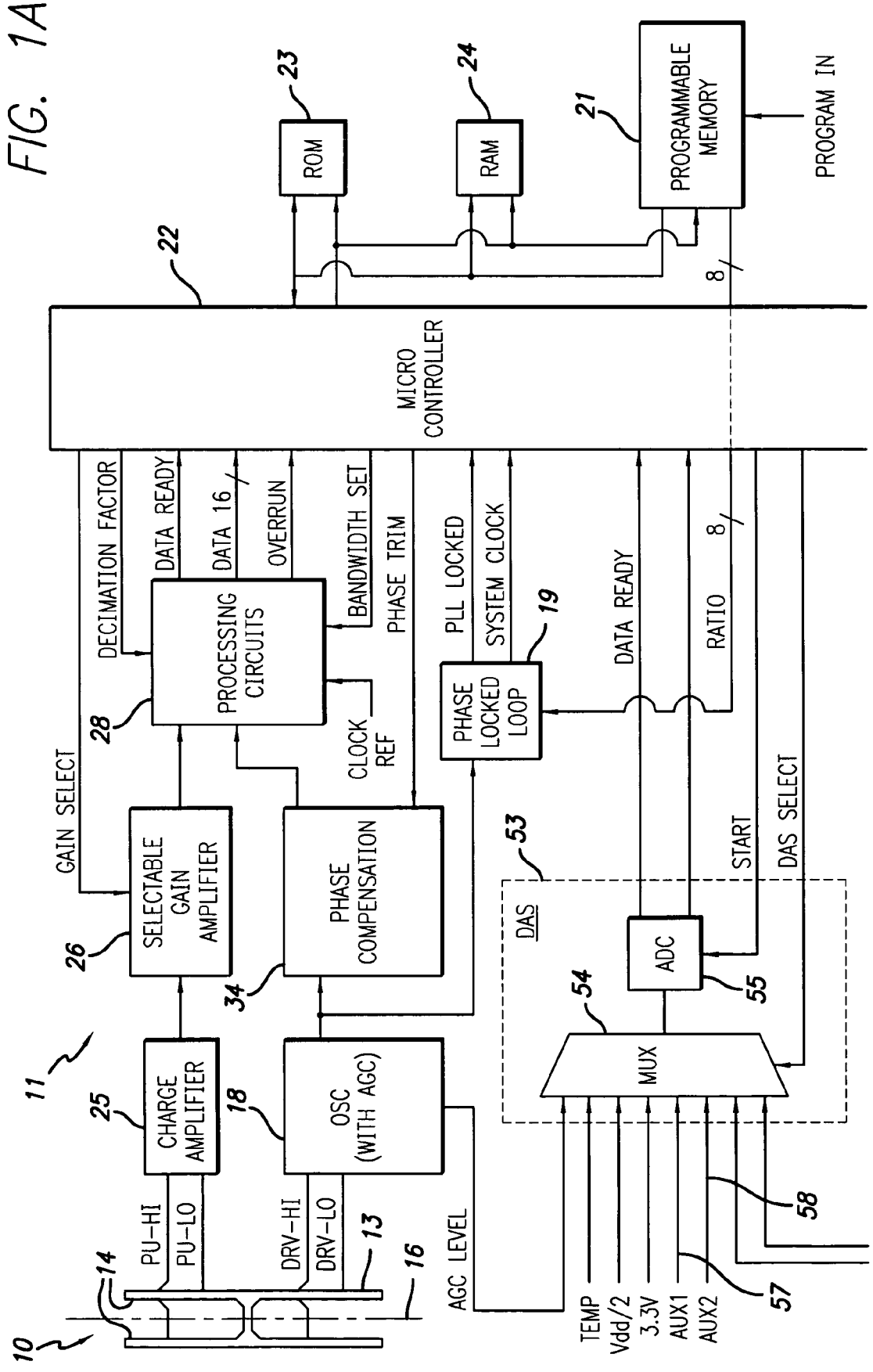
FIG. 1 is a block diagram of one embodiment of a rate sensor with which the invention can be implemented.
Figure 1B:
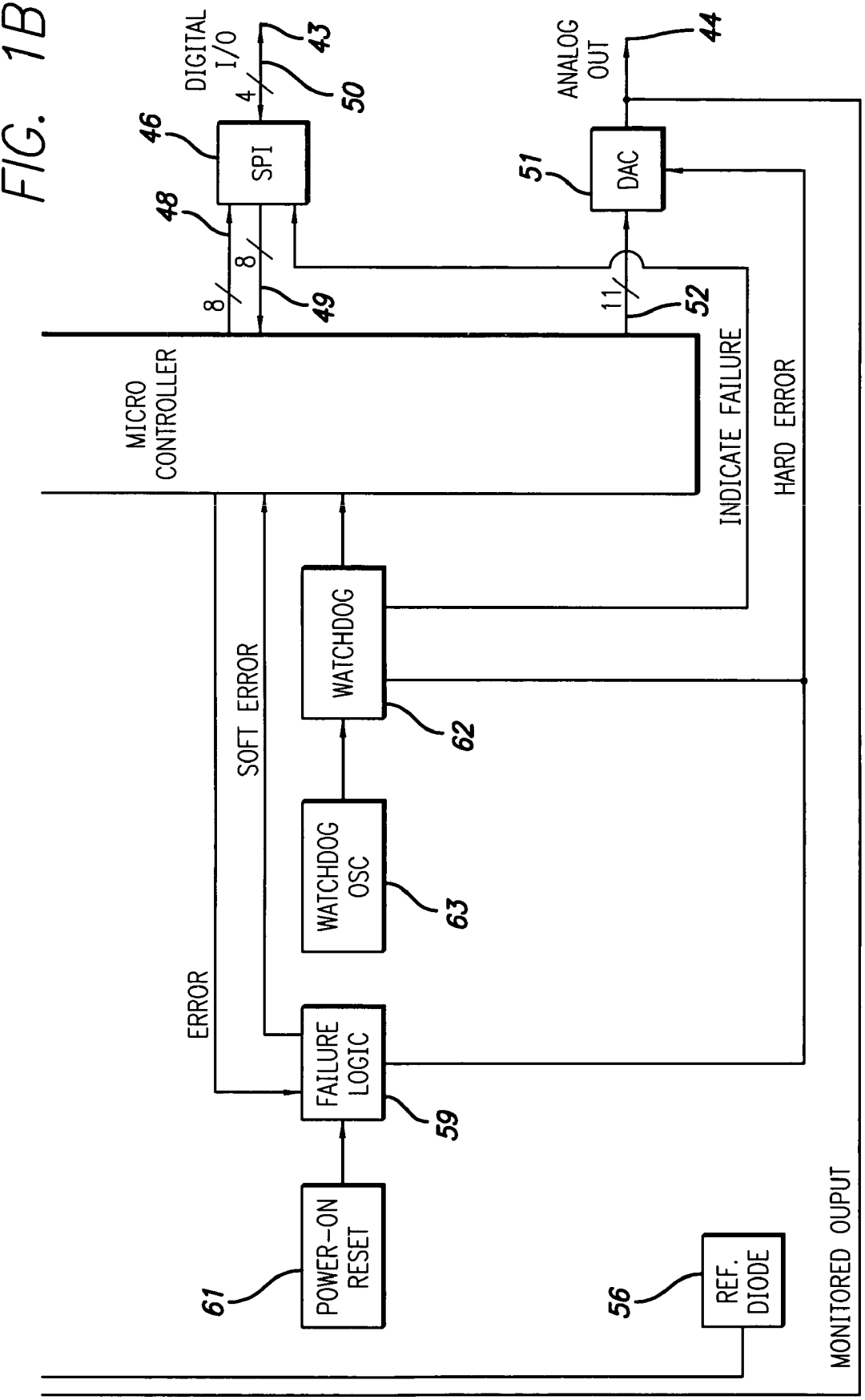

In the rate sensor illustrated in FIG. 1, the sensing element 10 is a double-ended tuning fork which is fabricated of single crystal quartz material and has an H-shaped configuration with drive tines 13 at one end and pickup tines 14 at the other. Each pair of tines is disposed symmetrically about the longitudinal axis 16 of the tuning fork. Drive high and drive low signals are applied to electrodes on the drive tines, and pickup high and pickup low signals are received from electrodes on the pickup tines.

The drive signals are generated by an oscillator 18 with automatic gain control (AGC), which can, for example, be of the type disclosed in U.S. Pat. No. 6,510,737. This circuit excites the drive tines to vibrate at the natural frequency of the drive mode, with the AGC maintaining the amplitude of the drive mode vibration at a substantially constant level.

The oscillator also provides a reference signal to a phase locked loop (PLL) circuit 19 which operates at an integral multiple of the oscillator frequency. The multiple or ratio is configurable to accommodate the drive frequencies of different sensing elements and is stored as an 8-bit word in a programmable memory 21. Thus, for example, a PLL circuit designed to operate within a band of 16 MHz±0.8 MHz can be used with sensors having drive frequencies on the order of 6–40 KHz by multiplying the oscillator frequency by an integer in the range of 380 to 2800.

Memory 21 can be any suitable non-volatile memory that can be programmed electronically from outside the sensor, typically via one or more of the input/output (I/O) terminals of the sensor. In one presently preferred embodiment, the memory is a "Zener-zap" array with a plurality of one-time programmable 8-bit words. However, other well known types of programmable memory, e.g. EEPROM, can be used, if desired.

The system also includes a micro-controller 22 with read only memory (ROM) 23 and random access memory (RAM) 24. The PLL circuit provides a PLL LOCKED signal to the micro-controller when it is locked, and it also provides a SYSTEM CLOCK signal to the micro-controller.

The angular rate signal from sensing element 10 is applied to a charge amplifier 25, and the output of the charge amplifier is connected to a selectable gain amplifier 26 which can provide a signal of suitable level for processing purposes from sensing elements having a wide range of output sensitivities. The gain of amplifier 26 is selected or controlled by a GAIN SELECT signal from micro-controller 22. The GAIN SELECT signal is derived from or controlled by data in programmable memory 21, and in one presently preferred embodiment, it is in the form of a 2-bit word that provides four gain settings in steps of 6 dB, e.g. 9, 15, 21 and 27 dB. Those settings will accommodate sensing elements which vary over a range of about 8:1 in output sensitivity.

The rate signal from amplifier 26 is digitized, demodulated, and filtered in a processing circuit 28 which is described in detail in Ser. No. 10/900,056, the disclosure of which is incorporated by reference. The analog-to-digital conversion is performed by a sigma-delta converter which operates at a sub-multiple of the system clock and receives a CLOCK REF signal obtained by dividing down the system clock.

The digitized signal is passed through decimation and low pass filters in the processing circuit, then demodulated. The decimation factor is selected by a DECIMATION FACTOR signal from the micro-controller, and the demodulation is done at the frequency of the drive oscillator. A phase compensation circuit 34 controlled by a PHASE TRIM signal from the micro-controller maintains an accurate phase relationship between the demodulation signal and the vibration of the sensing element to eliminate the effects of quadrature error.

The demodulated signal then passes through a second decimation filter and a second low pass filter, the bandwidth of which is determined by a BANDWIDTH SET signal from the micro-controller.

In one current embodiment, the output signal from the processing circuit consists of 16-bit words delivered at a rate of 1 KHz. That signal is held in a buffer until it is read by the micro-controller. The processing circuit also sends a DATA READY signal to the micro-controller to indicate that data is available.

The sensor has both a digital output 43 and an analog output 44. The digital output is part of a digital input/output (I/O) port which is provided by a standard Serial Peripheral Interface (SPI) 46 which communicates with the micro-controller via 8-bit data lines 48, 49 and includes a 4-line data bus 50. The analog port is provided by an 11-bit digital-to-analog converter (DAC) 51 which receives data from the micro-controller via data line 52.

In one embodiment, the micro-controller outputs the rate output signal to the DAC to provide an analog rate output. However, the micro-controller can be configured via data stored in programmable memory 21 to output various other digital signals to the DAC, including, for example, internal reference voltage levels or temperature sensor output.

The micro-controller monitors the signal from processing circuit 28 and the other signals which are input to it to check for potential failure modes.

If desired, a continuous built-in test bit (CBIT) signal can be added to the charge amplifier, as described in detail in U.S. Pat. No. 6,714,070, the disclosure of which is incorporated by reference. The CBIT signal appears as a relatively large angular rate bias offset throughout the entire signal processing path. If something should malfunction anywhere in that path, the magnitude of the bias signal applied to the micro-controller by the signal processing circuits 28 will undergo a shift. If the shift exceeds a predetermined threshold, which can be controlled via the programmable memory, the micro-controller will interpret it as a fault.

Other signals are monitored to ensure that faults in other parts of the circuit will be detected. For example, the DATA READY signal from the processing circuits and the DATA READY signal from the data acquisition system (DAS) must be provided within an expected time interval, and the PLL LOCKED signal from the PLL circuit must indicate that a lock is achieved and maintained.

The micro-controller also monitors a number of other signals to check for potential failure modes. Many of those signals are analog in nature, and they are and converted to digital form and input to the micro-controller by a data acquisition system (DAS) 53 which includes an input multiplexer 54 and an analog-to-digital converter (ADC) 55. In the embodiment illustrated, the signals which are monitored in this manner include the AGC LEVEL signal from oscillator 18, a temperature sensor voltage TEMP, the $V_{dd}/2$ reference voltage, the 3.3 volt power level, and a diode bias voltage from a reference diode 56.

Monitoring the $V_{dd}/2$, 3.3 volt, and diode bias voltages is one way to provide an approximate check on the internal bandgap reference voltage within the IC in which circuit is constructed. Alternatively, one could switch the voltage reference of the DAC between the bandgap reference voltage and $V_{dd}$ and compare the monitored level of $V_{dd}/2$. A change in the bandgap reference voltage would be detected as a discrepancy between the measured values of $V_{dd}/2$ as monitored with the two different DAC reference sources.

In the embodiment illustrated, the analog angular rate output signal from DAC 51 is also input to multiplexer 54 to provide monitoring of the output signal. This allows the micro-controller to compare the magnitude of the analog output signal with the digital signal level from which it was derived. In this way, the integrity of both DAC 51 and data acquisition system 53 is verified.

In the embodiment shown, multiplexer 54 has two additional inputs 57, 58 which can be used for other analog reference signals or for the analog outputs of external sensors such as temperature sensors or accelerometers.

In the event that some sensors within a sensing system or a group of sensors do not have their own digital output interfaces, the outputs of such sensors can be applied to inputs 57, 58 and converted to digital form by ADC 55. That will allow digital output data from those sensors to be transmitted across the SPI bus connected to interface 46, thus eliminating the need for an external ADC and simplifying signal routing.

The signal to be monitored is selected by a DAS SELECT signal which is applied to multiplexer 54 by the micro-controller. At the end of the conversion, the ADC delivers a DATA READY signal to the micro-controller.

Each of the monitored signals can be compared with predetermined values or limits for fault detection. These limits can be encoded in the micro-controller ROM 23 and/or electronically configured via programmable memory 21. For example, since temperature should vary only gradually with time, any sudden jump in the temperature signal can be interpreted as a fault.

In the event that a failure is detected, the micro-controller delivers an ERROR signal to a failure logic circuit 59, where the error can be flagged in two ways. In one, the logic circuit sends a SOFT ERROR signal to serial interface 46, and failure is indicated as part of the serial I/O signal, possibly as an error code along with the suspect angular rate data. This is sometimes referred to as "soft" error flagging since the output is still provided. In the other, the failure logic circuit sends a HARD ERROR signal to DAC 51 which causes the analog output of the DAC to shift to a predetermined level, typically the positive voltage rail. With "hard" error flagging, the analog output is no longer provided after a failure is detected. Both types of error flagging can be utilized simultaneously, if desired.

Alternatively, instead of having a separate failure logic circuit 59 which does the error flagging, that function can be embedded in the micro-controller and its internal ROM, in which case both "hard" and "soft" error flagging can still be used.

At start-up, the "soft" error flagging is temporarily suspended or suppressed to allow the system consisting of the sensing element and the circuit to become fully active. In that regard, the failure logic circuit 59 is reset by a signal from a power-on reset circuit 61 when power is first applied or when the supply voltage drops below a critical threshold. However, the analog output at port 44 preferably remains at the positive voltage rail until the completion of the start-up sequence when the micro-controller has verified that all signals are within their predetermined acceptance limits.

A watchdog detector 62 is included in the circuit to prevent the possibility of the micro-controller failing without being detected. This detector is of conventional design, and it is clocked by a signal from an oscillator 63 which operates independently of the system clock. A fault or failure in the micro-processor is indicated at the output of the sensor.

A failure detected by the watchdog circuit 62 is communicated to the micro-controller. Failures are indicated at both analog and digital outputs, the first via a signal to DAC 51 ("hard failure"), the second by a failure indication signal sent to the SPI block 46.

The programmable, non-volatile memory 21 also contains information for compensating the sensor output to adjust for minor variations in sensing element sensitivity and for sensor bias offsets. These adjustments can also be made dependent on temperature by selecting the temperature signal in DAS 53 and inputting it to the micro-controller. This signal is averaged to reduce the effects of noise, then combined with the information stored in the programmable memory to compute compensation values appropriate for the current temperature reading.

Such compensation can be done, for example, by using a polynomial in which the variation in output compensation values is a function of temperature and by storing the coefficients of the polynomial in the programmable memory. In the case of output bias offset, the value of the polynomial computed for the current temperature is subtracted from the uncompensated sensor output. A similar computation can be made for output sensitivity. This serves to significantly reduce spurious variation of the sensor output signal with changes in temperature as compared with the uncompensated output signal.

If external sensor signals are monitored via external inputs 57, 58 and ADC 55, those signals can also be compensated for variations in sensitivity, offset variations, and/or thermal effects, if desired. The information required for such compensation can be stored in programmable memory 21, and this will improve the performance of multiple sensors without adding unnecessary complexity to the other sensors.

Figure 2:
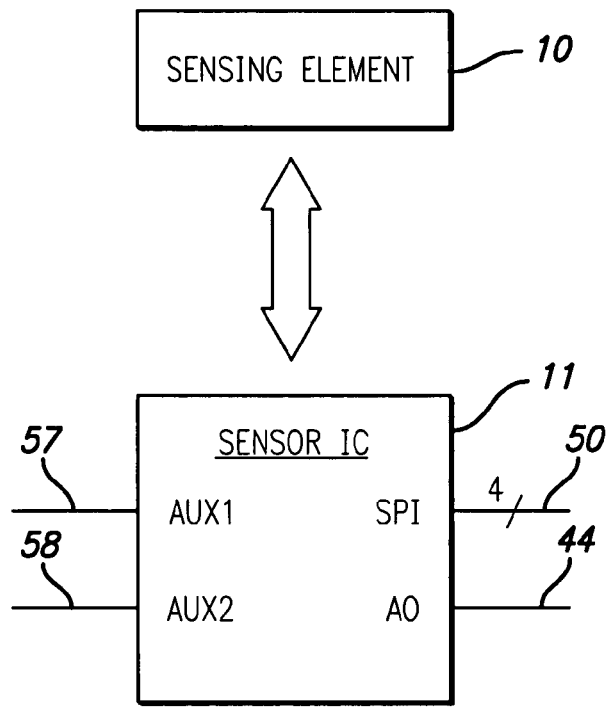
FIG. 2 is a simplified block diagram of the rate sensor in the embodiment of FIG. 1.

In FIG. 2, the sensor is represented in simplified form as consisting of sensing element 10 and sensor circuit 11 (labeled Sensor IC), with the Sensor IC interface being simplified to show only the two auxiliary analog inputs 57, 58 (labeled Aux1, Aux2), analog output 44 (labeled AO), and the SPI digital bus 50.

Figure 3:
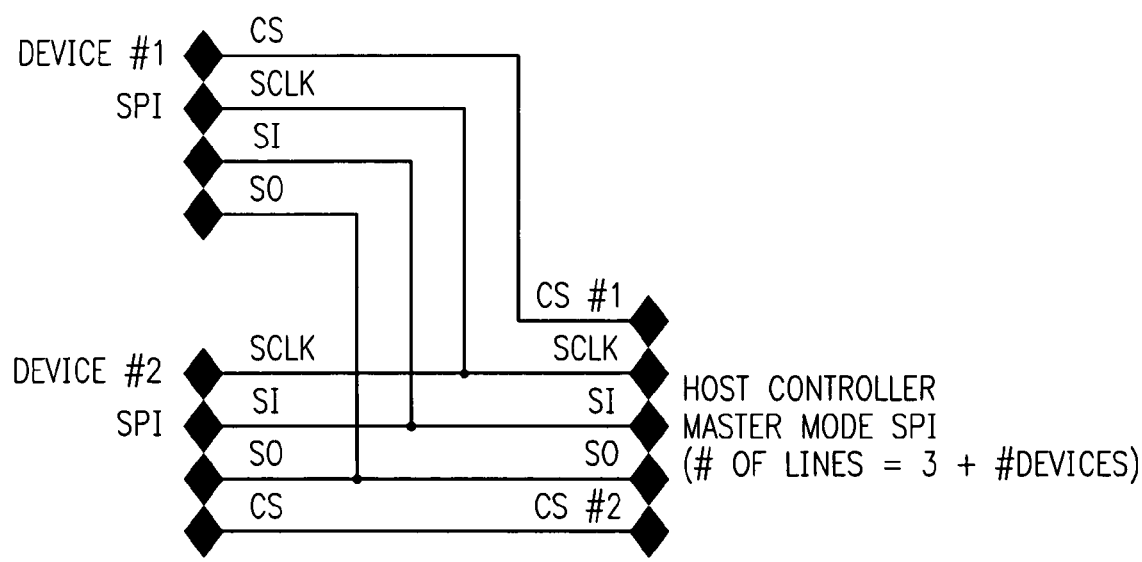
FIG. 3 is diagram of the data bus in one embodiment of a cross-monitoring sensor system incorporating the invention.

FIG. 3 illustrates a system in which two sensors (labeled Device #1 and Device #2) are connected as peripheral devices to a host controller via an SPI data bus. As illustrated, the SPI of each device has four I/O terminals: chip select (CS), system clock (SCLK), serial input (SI), and serial output (SO). Each device has a dedicated CS line, so the number of lines at the host controller is the number of devices using the SPI bus plus 3.

Figure 4:
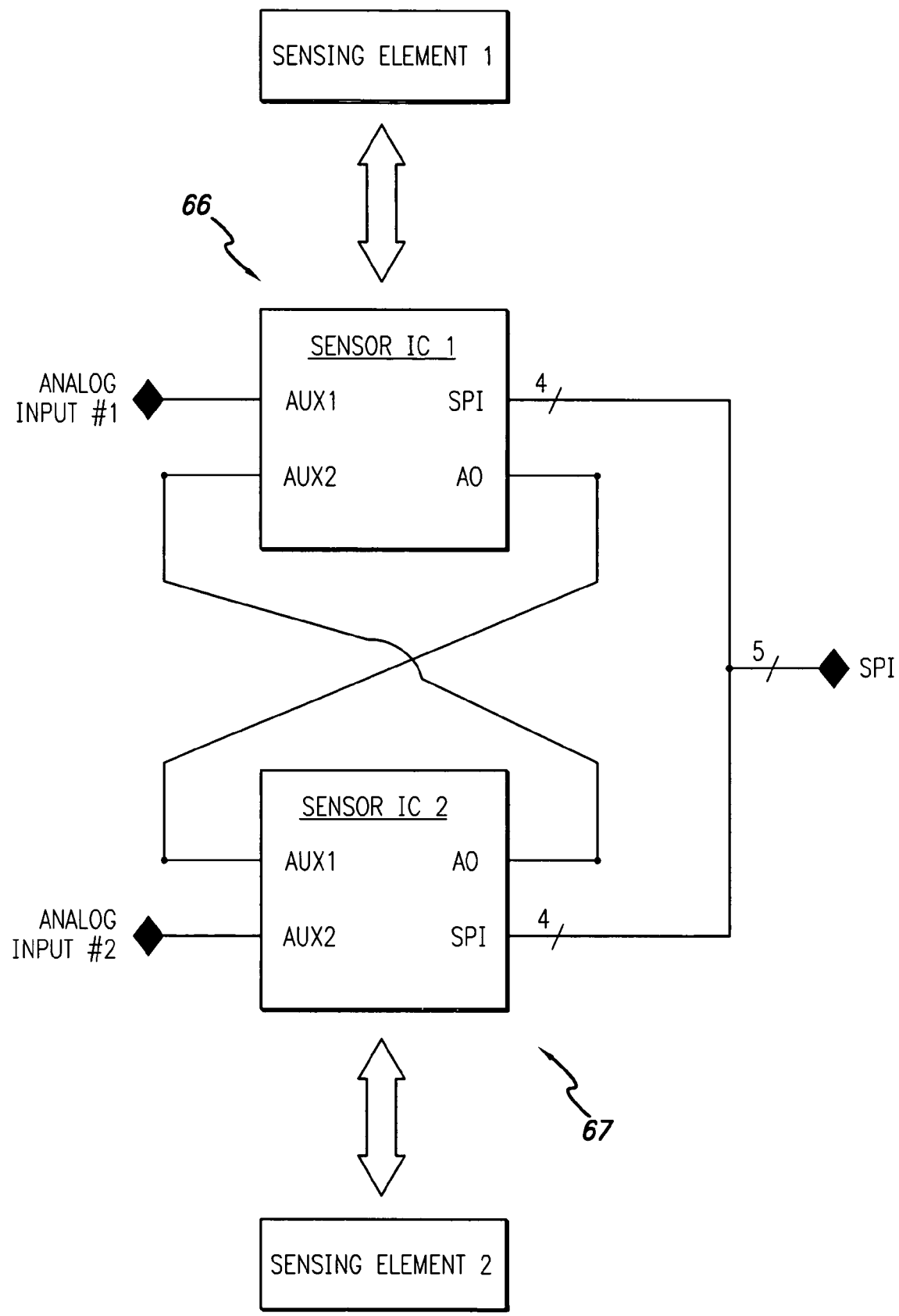
FIG. 4–8 are simplified block diagrams of embodiments of cross-monitoring sensor systems incorporating the invention.

FIG. 4 illustrates a system having a pair of sensors 66, 67 of the type previously described, with the individual SPI I/O port of each sensor being connected to the host controller. The sensors are cross-connected in that the analog output (AO) of sensor 66 is connected to the external input Aux1 of sensor 67, and the analog output (AO) of sensor 67 is connected to the external input Aux2 of sensor 66. Thus, each sensor provides its analog output to one of the external input channels of the other sensor. Both sensor circuits will digitize the analog input signals and provide the resulting data along with their own internal sensor data as digital output through the SPI interface.

Cross-monitoring is completed when the system reading the data through the SPI data line bus (e.g. a host computer in SPI master mode) compares the output of the internal sensor data from a given sensor with the data from the same sensor as monitored and output by the SPI interface of the second sensor, or any other sensor.

In the event of a malfunction in the SPI interface of one sensor, the data (if any) output by that interface will not agree with the same sensor's data as monitored and output by another sensor's SPI interface. This allows the system to determine whether the SPI interfaces in the individual sensors are functioning properly. Any disagreement in the data derived from the two SPI interfaces can be used to indicate a system fault.

The two sensors in FIG. 4 could, for example, be a pair of redundant angular rate sensors which both measure the same parameter, such as the yaw rate of a vehicle. They can also be similar types of sensors which monitor different parameters, e.g. angular rate sensors monitoring the yaw rate and the roll rate of a vehicle.

Figure 5:
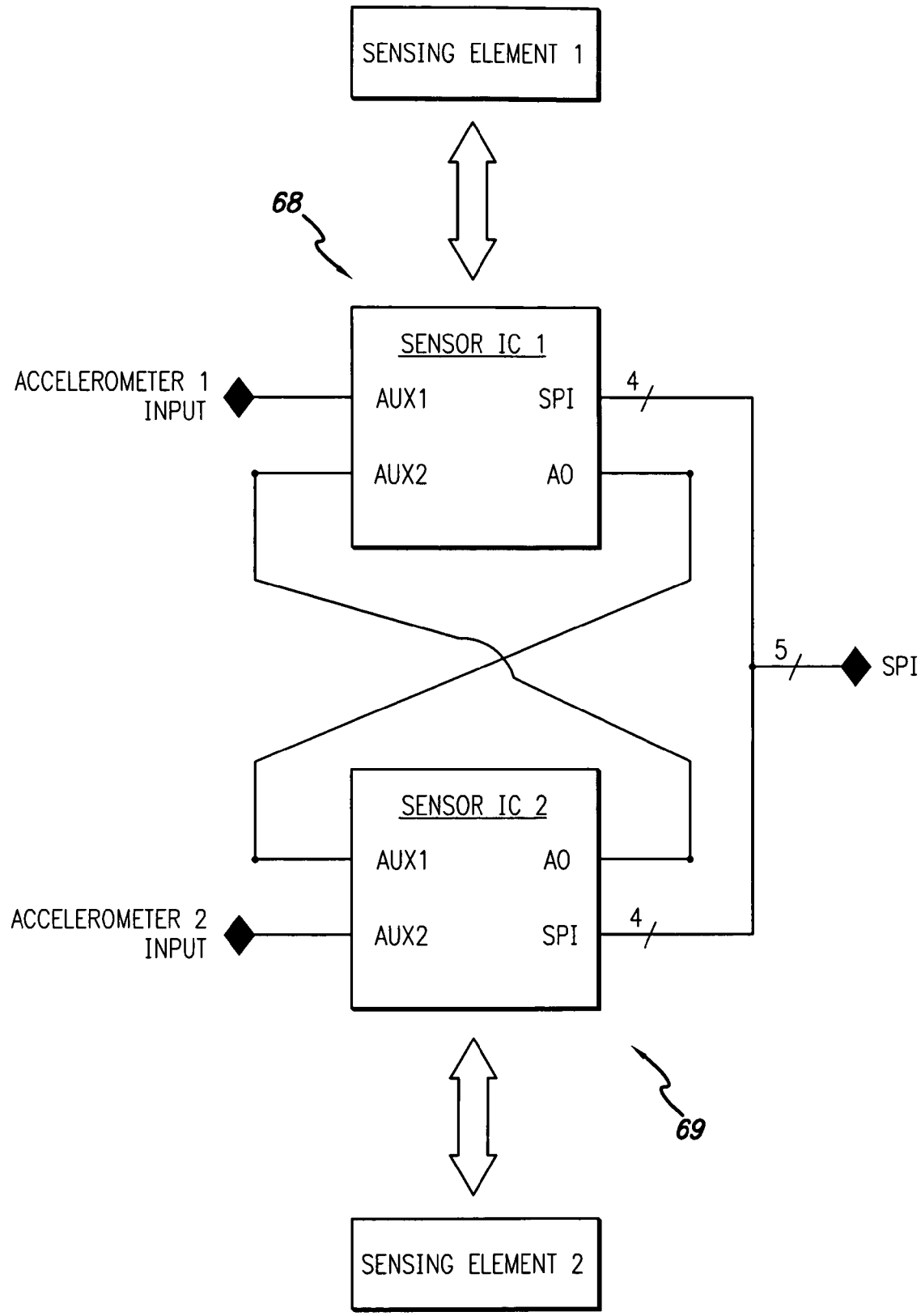

The embodiment illustrated in FIG. 5 is similar to the system of FIG. 4, with the analog output signals of two accelerometers being applied to external inputs Aux1 and Aux2 of sensors 68, 69, respectively. Those might, for example, be the lateral and/or longitudinal axis accelerometers used in the anti-skid and anti-rollover stability control systems of certain automobiles.

Figure 6:
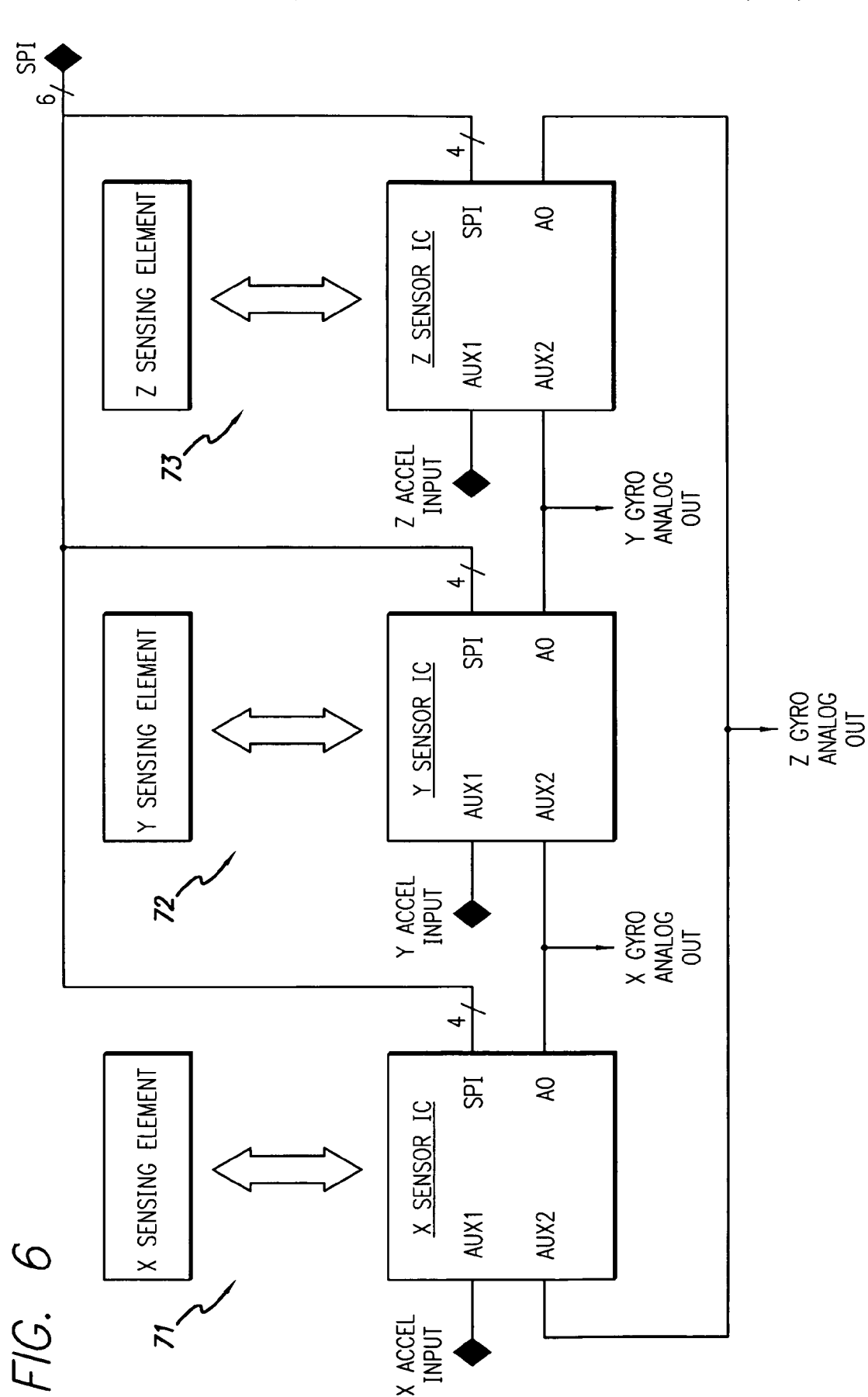

FIG. 6 illustrates an inertial measurement unit (IMU) with six degrees of freedom and cross-monitoring in accordance with the invention. This system has three sensors 71–73 for monitoring rotation about x-, y- and z-axes, respectively. Each of these sensors is conceptually similar to the sensor of FIG. 2, and they can all be quartz rate sensors or angular rate sensors of another type. The analog (AO) from x-axis sensor 71 is fed to one of the external inputs Aux2 of y-axis sensor 72, the analog output (AO) from sensor 72 is fed to one of the external inputs Aux2 of z-axis sensor 73, and the analog output (AO) from sensor 73 is fed back to one of the external inputs Aux2 of the x-axis sensor 71.

In this way, each angular rate or gyro signal derived from the x, y and z sensing elements is output to two separate SPI interfaces in the sensor IC's, and comparison of the data obtained from these two sources allows for cross-monitoring of the signals from all three of the sensors.

In addition, analog signals representative of acceleration along the x-, y- and z-axes can be input to the external channels of the sensors as shown in FIG. 6. The x, y and z accelerometer data will be available through the SPI interface, and all sensor data will be available on the same output bus without the added complexity of separate ADC circuits for the accelerometers.

Figure 7:
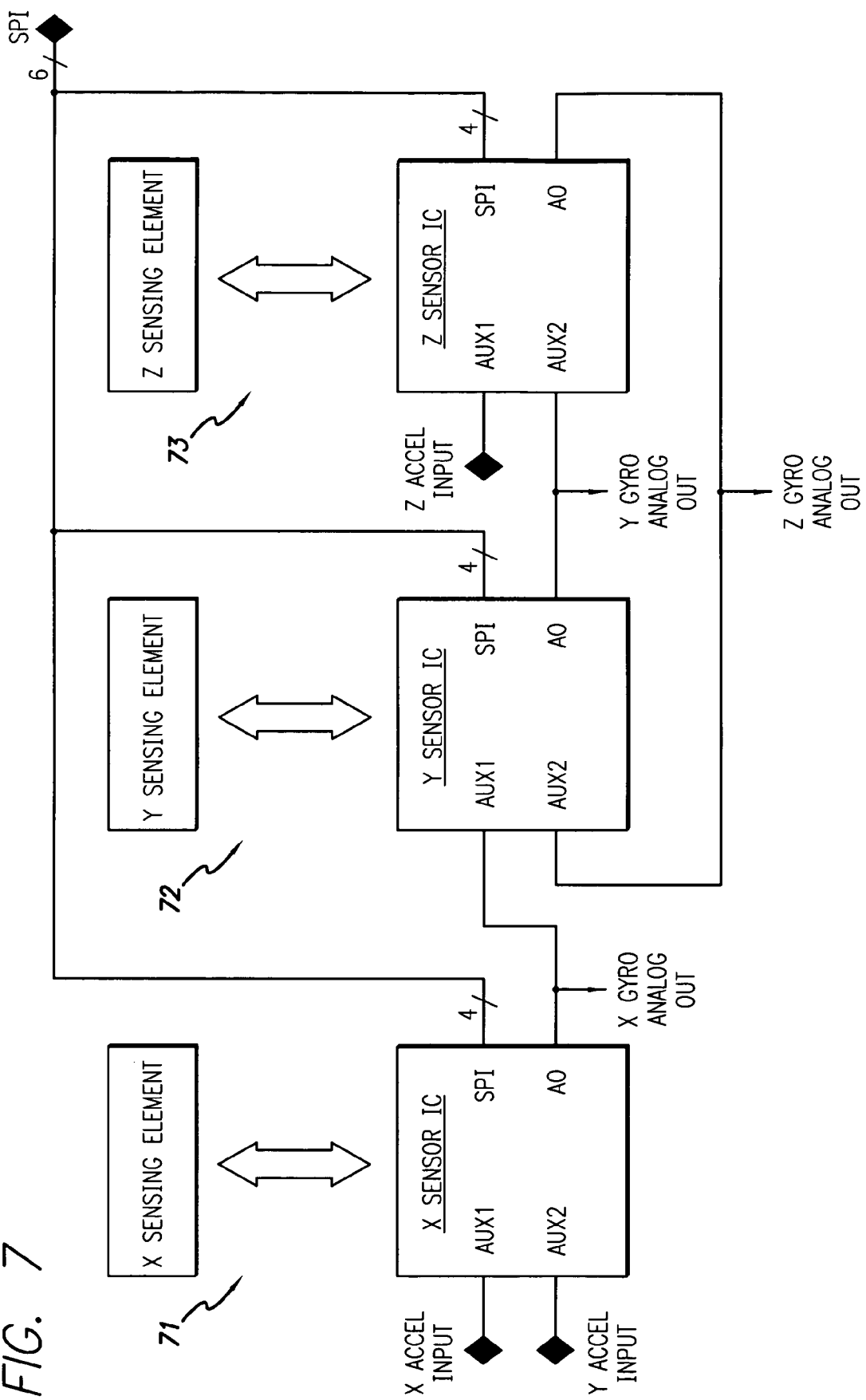

FIG. 7 shows another embodiment of a system having six degrees of freedom which is generally similar to the embodiment of FIG. 6 except that the analog outputs of the sensors are routed to a different combination of the auxiliary input channels. In this particular embodiment, the analog output of z-axis sensor 73 is fed back to one of the auxiliary inputs of y-axis sensor 72, and the y-axis accelerometer signal is input to the second auxiliary input of x-axis sensor 71. The configuration can be chosen as a matter of convenience for a specific application, and functions of cross-monitoring and digitization of the acceleration data will remain unchanged.

Figure 8:
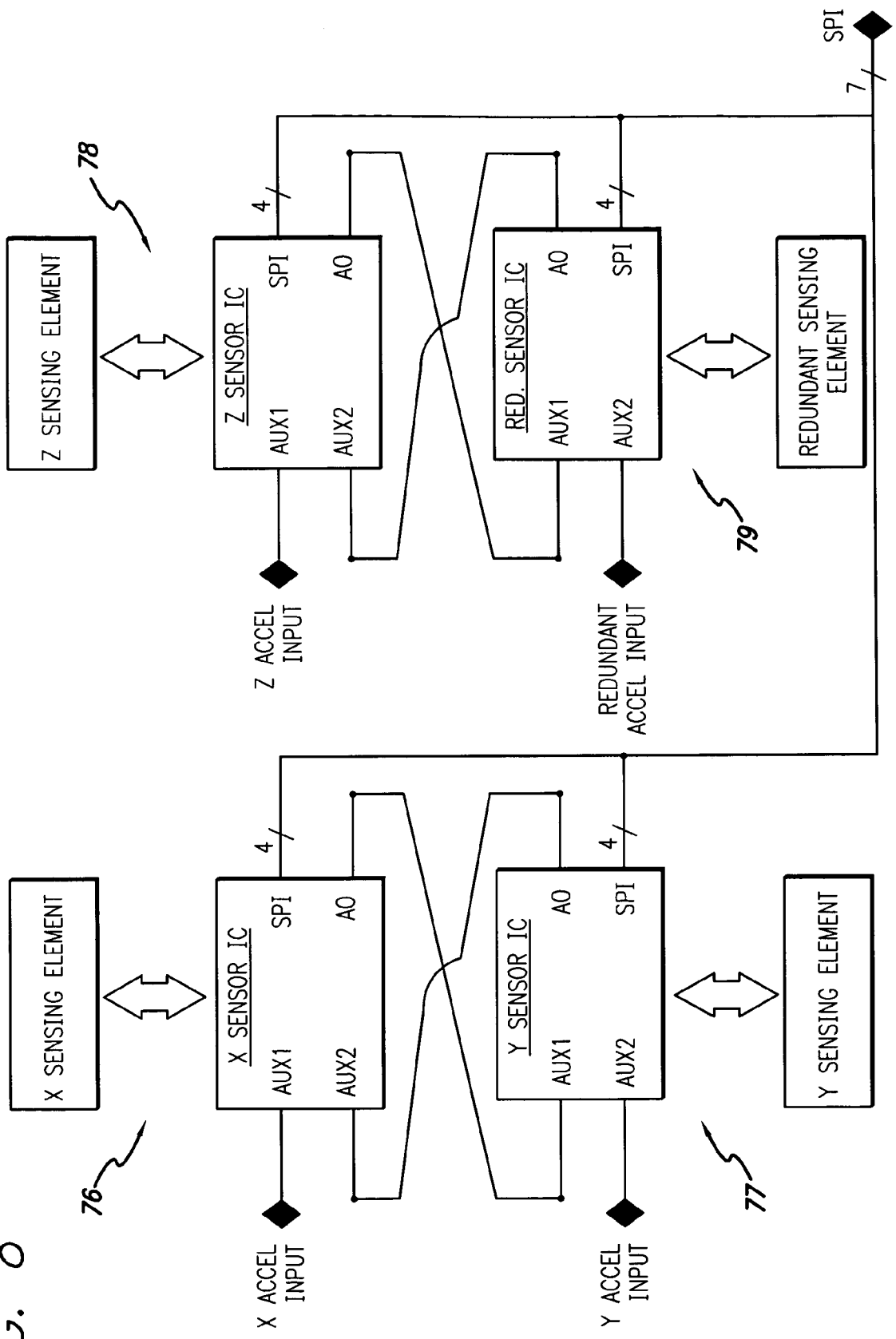

FIG. 8 illustrates an embodiment of an inertial measurement unit with six degrees of freedom and redundant angular rate and acceleration channels. This embodiment has four rate sensors 76–79 of the type shown in FIG. 2. Sensors 76–78 monitor rotation about x-, y- and z-axes and also receive x, y and z acceleration inputs. Sensor 79 is a redundant sensor which also monitors rotation about one of the three axes and receives one of the three acceleration signals as an external input. Alternatively, sensor 79 could receive the signal from a redundant (i.e., a fourth) accelerometer as an external input. Sensors 76 and 77 are cross-coupled, with the analog output (AO) of sensor 76 being connected to the auxiliary input Aux1 of sensor 77, and the analog output (AO) of sensor 77 being connected to the auxiliary input Aux2 of sensor 76. Sensors 78 and 79 are likewise cross-coupled, with the analog output (AO) of sensor 78 being connected to the auxiliary input Aux1 of sensor 79, and the analog output (AO) of sensor 79 being connected to the auxiliary input Aux2 of sensor 78. The digital outputs of all four sensors are connected to the SPI bus.

The invention has a number of important features and advantages. The functionality of the digital output interface is validated by providing an analog output in parallel with it. This output can provide a voltage proportional to the sensor signal, or it could simply switch from one predetermined voltage level to another to indicate a failure. The analog output can be converted back to a digital signal that can be monitored by the internal sensor logic or micro-controller to provide an additional level of fault detection.

In a system of multiple sensors, the ability of one or more of the sensors to monitor its own analog output signal or that of one or more other sensors can eliminate the risk of undetected failure in the digital output interface electronics for any or all of the sensors.

If one sensor is able to monitor the output of another sensor in the system and provide that output value to the system across its digital interface, the system can verify that the output signals from the original sensor and from the one doing the monitoring agree within acceptable limits. Thus, the proper functioning of both digital output interface circuits is verified.

The ability of the output circuit to cross-monitor in this manner significantly improves the reliability of fault detection in a sensing system or among a plurality of sensors. The additional sensors can be the same type as the first or a totally different type, e.g. an accelerometer and an angular rate sensor.

It is apparent from the foregoing that a new and improved cross-monitoring sensor system and method have been provided. While only certain presently preferred embodiments have been described in detail, as will be apparent to those familiar with the art, certain changes and modifications can be made without departing from the scope of the invention as defined by the following claims.

The invention claimed is:

1. A cross-monitoring sensor system, comprising:
    a plurality of sensors each having a sensing element, circuitry for processing signals from the sensing element, an output interface for delivering processed signals, and an auxiliary input to which signals from another device can be input for processing by the circuitry and delivery by the output interface;
    means for applying processed signals from the output interface of each of the sensors to the auxiliary input of another one of the sensors;
    and means for comparing signals from the output interfaces of the sensors.

2. The system of claim 1 wherein each of the sensors includes an analog-to-to digital converter, the output interface of each of the sensors includes a digital interface and an analog output, and the system includes means for applying signals from the analog output of one sensor to the auxiliary input of another sensor for conversion to digital signals by the analog-to-digital converter in the other sensor and comparison with unprocessed digital signals in the other sensor, and means for comparing output signals from the digital interfaces of the sensors.

3. The system of claim 1 wherein each of the sensors has a second auxiliary input to which an additional signal from another device can be applied for processing by the circuitry and delivery by the output interface of that sensor.

4. The system of claim 1 wherein the sensors are selected from the group consisting of angular rate sensors, accelerometers, and combinations thereof.

5. A method of monitoring the operation of a plurality of sensors each having a sensing element, circuitry for processing signals from the sensing element, an output interface for delivering processed signals, and an auxiliary input to which signals from another device can be input for processing by the circuitry and delivery by the output interface, comprising the steps of: applying processed signals from the output interface of each of the sensors to the auxiliary input of another one of the sensors, and comparing signals from the output interfaces of the sensors.

6. The method of claim 5 wherein the sensors are connected together in a series, with the signals from the output interface of one sensor being applied to the auxiliary input of the next sensor in the series, and the signals from the output interface of the last sensor in the series being connected to the auxiliary input of the first.

7. The method of claim 5 wherein the signals from the output interface of a first one of the sensors are applied to the auxiliary input of a second one of the sensors, and the signals from the output interface of the second one of the sensors are applied to the auxiliary input of the first one.

8. The method of claim 5 including the step of applying additional external signals to additional auxiliary inputs of the sensors.

9. A cross-monitoring sensor system, comprising: a plurality of sensors each having a sensing element, an analog-to-digital converter, an analog output for delivering analog output signals, a digital output interface for delivering digital signals, and an auxiliary analog input to which signals from another device can be input for digitizing and delivery by the output interface, means for applying signals from the analog output of each of the sensors to the auxiliary input of another one of the sensors, and means for comparing signals from the digital output interfaces of the sensors.

10. The system of claim 9 wherein each of the sensors also has a second auxiliary input to which an analog signal from another device can be applied.

11. The system of claim 9 wherein the sensors are selected from the group consisting of angular rate sensors, accelerometers, and combinations thereof.

12. A cross-monitoring sensor system, comprising: first and second sensors each having a sensing element, an analog-to-digital converter, an analog output for delivering analog output signals, a digital output interface for delivering digital signals, and an auxiliary analog input to which signals from another device can be input for digitizing and delivery by the output interface, means for applying signals from the analog output of the first sensor to the auxiliary input of the second and from the analog output of the second sensor to the auxiliary input of the first, and means for comparing signals from the digital output Interfaces of the sensors.

13. The system of claim 12 wherein each of the sensors also has a second auxiliary input to which an analog signal from another device can be applied.

14. The system of claim 13 wherein the sensors are selected from the group consisting of angular rate sensors, accelerometers, and combinations thereof.

15. A cross-monitoring sensor system, comprising: a series of sensors each having a sensing element, an analog-to-digital converter, an analog output for delivering analog output signals, a digital output interface for delivering digital signals, and an auxiliary analog input to which signals from another device can be input for digitizing and delivery by the output interface, means for applying signals from the analog output of each sensor to the auxiliary input of the next sensor in the series and from the analog output of the last sensor in the series to the auxiliary input of the first, and means for comparing signals from the digital output interfaces of the sensors.

16. The system of claim 15 wherein each of the sensors also has a second auxiliary input to which an analog signal from another device can be applied.

17. The system of claim 15 wherein the sensors are selected from the group consisting of angular rate sensors, accelerometers, and combinations thereof.

18. A cross-monitoring sensor system, comprising:
a plurality of sensors each having a sensing element, circuitry for processing signals from the sensing element and for monitoring other signals within the sensor, an output interface for delivering processed signals, and an auxiliary input to which signals from another device can be input for processing by the circuitry and delivery by the output interface;
means for applying processed signals from the output interface of each of the sensors to the auxiliary input of another one of the sensors;
and means for comparing signals from the output interfaces of the sensors.

19. The system of claim 18 wherein the circuitry includes an analog-to-digital converter and means for selectively applying the signals from the sensor, the other signals within the sensor, and signals applied to the auxiliary input to the analog-to-digital converter.

* * * * *